M. K. DAHL.
Plow.
No. 100,869. Patented March 15, 1870.
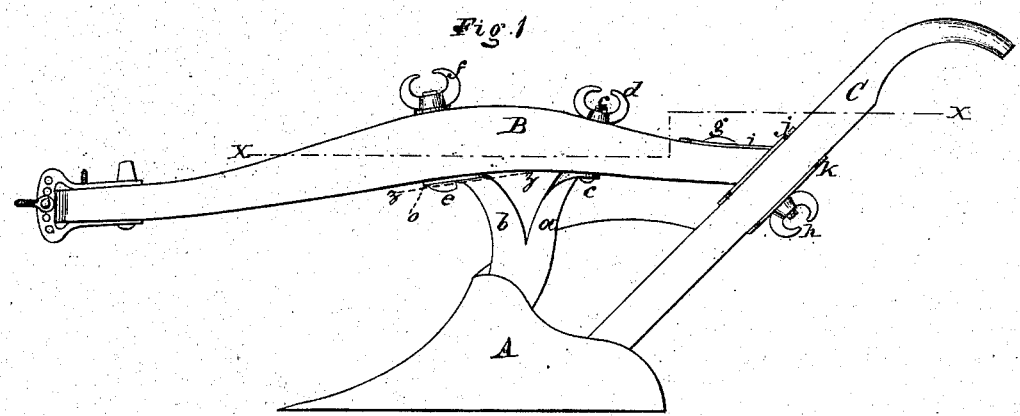
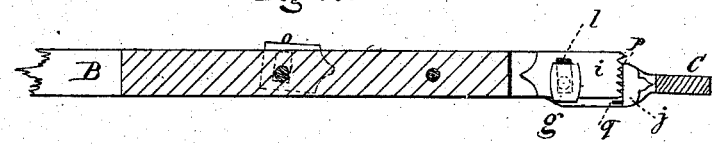
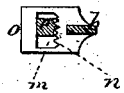

UNITED STATES PATENT OFFICE.

M. K. DAHL, OF WAUPUN, WISCONSIN.

IMPROVEMENT IN PLOWS.

Specification forming part of Letters Patent No. 100,869, dated March 15, 1870.

*To all whom it may concern:*

Be it known that I, M. K. DAHL, of Waupun, in the county of Fond du Lac and State of Wisconsin, have invented certain new and useful Improvements in Plows; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention I will proceed to describe it.

My invention relates to plows; and it consists in a novel manner of connecting the beam to the standards and handle for the purpose of allowing it to be adjusted horizontally and securely locked in position when so adjusted.

In the drawings, Figure 1 is a side elevation; Fig. 2, a horizontal section on the line $x\, x$ of Fig. 1; and Fig. 3 a cross-section on the line $z\, z$ of Fig. 1, looking upward.

In the construction of plows it is often very desirable to change the direction of the beam in relation to that of the plow proper, so as to throw the share to the landside or in the opposite direction. This I accomplish by my peculiar manner of connecting the beam, and in such a way that all the parts can be rigidly locked together at each adjustment.

I construct my plow A with its beam B and handle C in the usual form, as shown in Fig. 1, and provide it with two standards, $a$ and $b$, and each of these standards with a flat head-plate. The head-plate $o$ of the forward standard I form with a transverse slot, $m$, having its rear side provided with a series of notches or teeth, $n$, as clearly shown in Fig. 3. The beam B, I place on these standards, and pass a bolt, C, up through the rear standard and the beam, and fasten it by means of a thumb-nut, $d$, so that the beam may turn or swivel on this bolt, as hereinafter described. I then provide a bolt, $e$, having one or more teeth on one side of its head corresponding in size with the notches $n$ on the rear side of the transverse slot $m$, as shown in Fig. 3, and pass it up through the slot $m$ in the forward standard and the beam, and fasten it by means of the thumb-nut $f$, as clearly shown in Fig. 1. The rear end of the beam B, I shape so as to fit smoothly against the front side of the handle C, and provide it with a plate, $i$, having teeth $p$ on its rear end, and to the handle C secure on its front side a plate, $j$, with grooves or indentations $q$ on its outer side, to correspond with the teeth $p$ on the end of the plate $i$, and on the rear side of the handle a plate $k$. The rear end of the beam and the plate $i$ are provided with a slot, $l$, as clearly shown in Fig. 2. Through this slot $l$ and the handle C, I pass a bolt, $g$, and lock it with a thumb-nut, $h$, on the under side, as shown in Fig. 1. When the beam B is thus arranged and connected to the standards and the handle, it may be readily adjusted, as desired, by simply releasing it when fixed by loosening the nuts $f$ and $h$, and then turning it on the bolt C. As soon as it is turned either to the right or left to the desired position, it can then be securely locked by turning the nuts $f$ and $h$. As the nut $f$ is turned, the tooth or teeth on the side of the head of the bolt $e$ engage with those on the rear side of the slot $m$, as shown in Fig. 3, and as the nut $h$ is turned the teeth on the end of the plate $i$ engage with those on the plate $j$, as shown in Fig. 2. It will be noticed, also, that as the distance from the rear standard, $a$, to which the beam B is pivoted, is much greater to the front end of the beam than it is to the rear end; that the front end will move through much the largest arc of a circle, and that by moving the beam the plowshare may be thrown to land or in the opposite direction, as desired; and it will be also noticed that this construction admits of a movement of the beam, so as to accommodate any number of horses, and thus obviate the necessity of using three-horse clevises.

Having thus described my invention, what I claim is—

1. A plow having its beam B connected to two standards, $a\, b$, and to handle C by bolts $c$, $e$, and $g$, in such a manner that it may be turned on the standard $a$ and be adjusted and locked to the standard $b$ and handle C, as herein described, and for the purpose set forth.

2. The plate $i$, provided with the slot $l$ and the serrations at its rear end, in combination with the serrated plate $j$, and bolt $g$, with its nut $h$, when the same are arranged as herein described.

3. The combination of the standard $b$, having slot $i$, with its rear side toothed, with the bolt $e$, beam B, and nut $f$, when constructed and arranged as herein described, and for the purpose set forth.

M. K. DAHL.

Witnesses:
A. NUDD,
P. DONOVAN,